Figure 1:
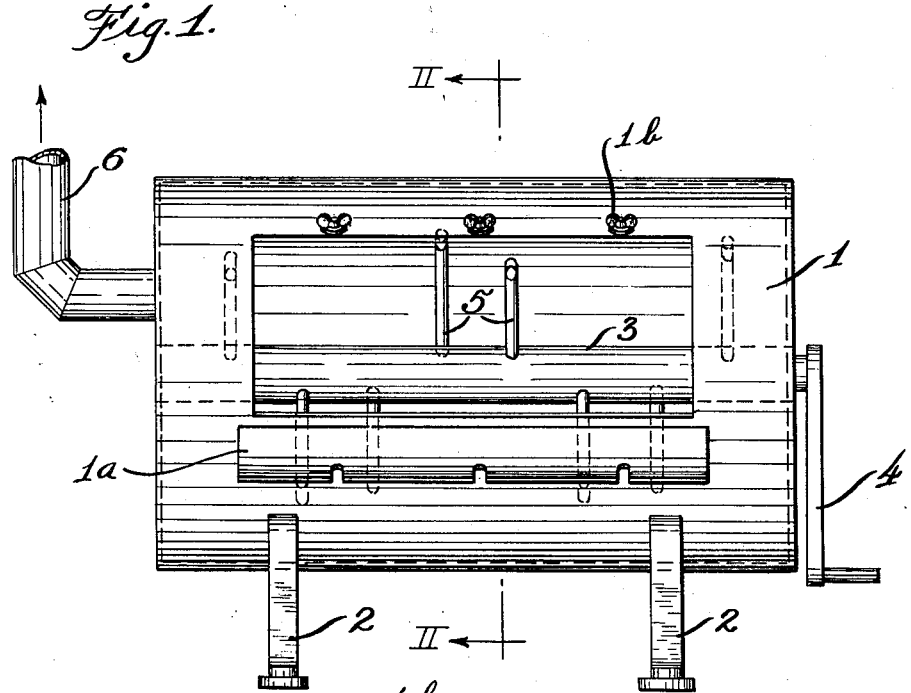

Feb. 23, 1954    W. J. WISWESSER    2,670,305
METHOD OF MAKING FILTER MATERIAL
Filed March 26, 1951

Inventor
WILLIAM J. WISWESSER
By
William J. Ruano
Attorney

Patented Feb. 23, 1954

2,670,305

UNITED STATES PATENT OFFICE 2,670,305

METHOD OF MAKING FILTER MATERIAL

William J. Wiswesser, Kutztown, Pa., assignor to Willson Products, Inc., Reading, Pa., a corporation of Pennsylvania Application March 26, 1951, Serial No. 217,497

6 Claims. (Cl. 117—4)

The present invention relates to a method of manufacturing filter material to make it particularly suitable for respirators and other air cleaning apparatus.

Felts are in general use for filtering gas and air, including felts made of wool fibers or mixtures of such fibers with other fibers. In general, the smaller the interstices through which air is passed the more effective the filtering action.

Recently the filtering action of felt has been improved by impregnating a continuous web of felt with a resinous solution, then squeezing out the excess by rollers and allowing the felt to dry, and finally running the dried felt between fluted rollers or through a row of stationary bars arranged to bend the felt many times at closely spaced intervals, thereby breaking up the resinous material into small fragments. These fragments adhere to the fibers, provide smaller interstices within the felt and otherwise improve the filtering action.

An outstanding disadvantage of the above described method, however, is that in the drying process, such as takes place in a hot air dryer, the resinous material migrates to the surface of the felt with the evaporating solvent, therefore fails to remain deep in the filtering bed where it would be most effective for filtering, also much of the resin is lost by dusting away at the surface. Furthermore, the evaporating or drying process is not only time-consuming, but exceedingly wasteful and uneconomical since the evaporated solvent is lost unless very expensive recovery equipment is used. Moreover, lateral deflection of the felt sheet by passing through fluted rollers or woven through stationary bars, while effecting some breakage of the resinous material into smaller particles, fails to subdivide the material sufficiently for most effective filtering action.

An object of the present invention is to provide a method of treating felt which is devoid of the above named disadvantages involved in prior methods.

A further object of the present invention is to provide a novel method of treating felt which will provide an amazing increase in its filtering effectiveness for the removal of silica dust and other finely divided toxic agents present in the air which is breathed by workers in various industries.

A still further object of the invention is to provide a novel method for treating felt to make it especially suitable for respirators and the like, which method will insure uniform dispersion of resinous fragments throughout the entire mass of filtering material to greatly increase the filtering efficiency of the felt, and which method is speedy and inexpensive, involving relatively low loss of solvent as compared to the aforementioned known method.

Figure 2:
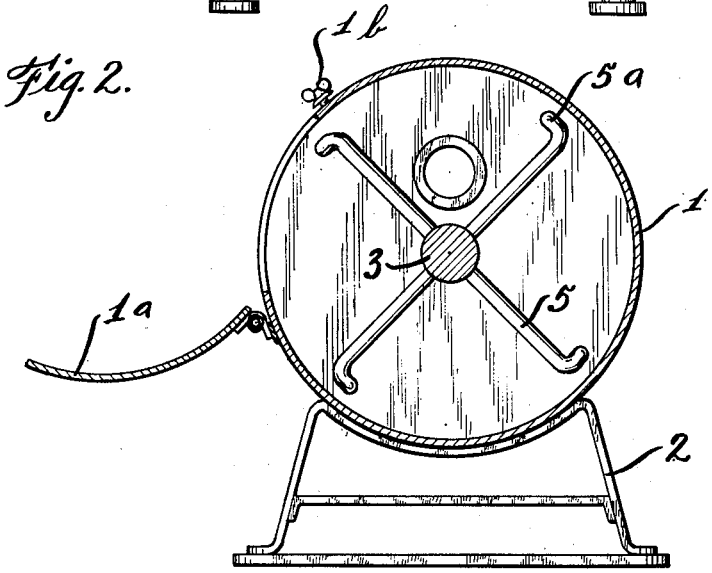

Other objects and advantages of the present invention will be apparent from a study of the following description, taken with the accompanying drawings wherein:

Fig. 1 is an elevational view of an agitator employed for mechanically working resin-impregnated sheets after they have been dried in order to thoroughly break up the resinous material into very fine particles, and Fig. 2 is a transverse cross-sectional view of the agitator shown in Fig. 1.

In accordance with the present invention, felt made from wool fibers, or mixtures of wool with other fibers, cotton sheets or other kinds of matted fibers, is cut up into sheets, for example, 18" x 24" size, rather than being used as a continuous web, in order to attain the objects of the present method. These sheets when received from the manufacturer are first degreased to remove processing oils and wool grease comprising 1 to 3% of the wool weight, which oils and grease, if retained, would plasticize the later added resin and injure the necessary resin brittleness.

Then the sheets are dipped into a solution of resin in organic solvent, such as, for example, zinc resinate dissolved in trichloroethylene. Preferably such solution should contain a relatively high concentration of resin such as about 25 to 30% resin. Then instead of squeezing the excess resin solution by means of a clothes wringer, as in the above described previously used method, the dipped felt sheets are placed in a centrifuge of any well known design and spun, thus liberating most of the resin solution by centrifugal force and enabling the subsequent recovery of a much greater quantity of solvent and minimizing loss in the drier and still enabling the deposit of a sufficient amount of resin throughout the entire body of the filter to insure thorough coating of all the fibers deep in the filtering bed.

Afterwards the partially dried felt sheets are removed from the centrifuge and allowed to thoroughly dry, such as by exposure to heated or unheated air or to infra red radiations, thereby evaporating the remaining solvent, leaving a solid porous mass of resin. Thus, the resin stays where it is deposited, deep in the filtering bed, rather than migrating to the surface with the evaporating solvent as occurs in common practice wherein the excess solvent is removed by squeezing the sheets through a wringer and subsequently drying because of the large amount of solution still remaining even after such squeezing which must be disposed of by evaporation which is accompanied by mass migration of resin to the surface. This leaves the core substantially devoid of the desired resin. Hence, in accordance with the present method, less resin is lost by dusting away at the surface and more remains in the deep interior of the felt sheets where its plugging action is most beneficial.

Then finally the dried felt sheets are placed in an agitator of any suitable design, such as that shown in the drawing, in order to break up the resin into small fragments, some of which will adhere to the felt fibers and some of which will merely remain deposited in the interstices formed by the fibers. Alternatively the drying and agitating steps may be combined by passing heated air through the sheets before or while they are being agitated.

Referring to the drawing which shows an agitator for beating the dried sheets, numeral 1 denotes a cylindrical housing having an access opening which is closed by door 1a pivotally mounted on the housing. The housing is mounted on supports 2. Rotatably mounted on the housing end walls is a shaft 3 driven by a driving crankshaft 4. Shaft 3 has a plurality of radially extending spiders 5 which are spaced longitudinally and staggered in a circumferential direction, which spiders terminate in hooked or horn-like hitting end portions 5a which are preferably rounded and highly polished. The sheets of resin impregnated felt are inserted through the door into the housing and shaft 3 is driven at about 100 R. P. M. The spiders violently flex and beat the felt sheets causing them to crumple. Simultaneously, air is exhausted through exhaust pipe 6 by any suitable air forcing means, such as a blower (not shown) removing the resin dust. With about 15 sheets to a batch, about 1 minute cycle of beating is sufficient to break up the resin into very small fragments which become lodged within the interstices of the filter material and many of which adhere to the fibers to increase, to an amazing extent, filtering effectiveness with respect to silica dust, lead fumes, lead dust and the like. For instance, while filters made by known methods seldom have a leakage of under 1.0 or 2.0 mg., yet filters treated according to the present invention have a leakage of between 0 and 0.1 mg., thus providing remarkable and unexpected increases in filtering efficiency particularly in the separation of very small particles from impure air. Also, the finished felt sheets are considerably fluffier and softer than felt treated by known methods, thereby providing a greater number of minute cells which considerably increases the filtering effectiveness.

The sheets are finally cut into disc shapes or other desired shapes to adapt them to respirators or other air purifying or filtering apparatus.

Of course, other resin solutions may be used instead of that described, such as zinc hardened rosin in carbon tetrachloride. Other suitable resins are orange shellac, polystyrene, polymethyl-methacrylate, brittle natural gums, etc.

Thus it will be seen that I have provided a novel and highly efficient method for treating felts quickly and inexpensively, which method by virtue of the use of a centrifuge instead of wringer rollers for drying, considerably reduces the amount of residual solution retained in the felt, therefore enables the use or greater concentrations of resin solution, thus minimizing the amount of solvent required and reducing the amount of solvent lost; as well as preventing subsequent migration of resin particles to the surface as a consequence of the subsequent faster drying process; also, the cutting up of the dry, resin-containing felt into sheets and the violent agitation thereof as distinguished from lateral flexing of a continuous web not only breaks up the resin into much smaller particles, but causes amazingly greater fluffiness and unexpectedly better filtering efficiency than that heretofore obtainable.

While I have illustrated and described one specific embodiment of my novel method, it will be understood that this is by way of illustration only, and that various changes and modifications may be made within the contemplation of my invention and within the scope of the following claims.

I claim:

1. The method of treating felt to considerably increase its air filtering quality, comprising forming the felt into a plurality of small sheets of length approximating the width thereof, impregnating the sheets with a solution of organic solvent and a resin which becomes frangible when dried, spinning said sheets at high speed and thereby removing most of the resin solution by centrifugal force and subjecting said sheets to a drying atmosphere to effect drying thereof, agitating and continuously beating said dried sheets while in loose, crumpled condition until the resin contained therein is finely divided into exceedingly small particles that become lodged in the interstices and considerably increase the air filtering efficiency, and finally cutting said sheets into sizes and shapes desired as filters.

2. The method recited in claim 1 wherein said solution is of relatively high concentration containing of the order of 25% resin.

3. The method recited in claim 1 wherein said solution contains about 25 to 30% zinc resinate dissolved in trichloroethylene.

4. The method in claim 1 wherein said resin comprises zinc resinate.

5. The method recited in claim 1 wherein said resin solution comprises zinc hardened rosin dissolved in carbon tetrachloride.

6. The method recited in claim 1 wherein said resin is selected from the group consisting of zinc resinate, zinc hardened rosin, orange shellac, polystyrene, polymethyl-methacrylate and brittle natural gums.

WILLIAM J. WISWESSER.

References Cited in the file of this patent

UNITED STATES PATENTS

| Number | Name | Date |
|---|---|---|
| 1,612,585 | Jackson | Dec. 28, 1926 |
| 2,196,256 | Dreyfus et al. | Apr. 9, 1940 |
| 2,366,853 | Greene | Jan. 9, 1945 |
| 2,385,300 | Ronci | Oct. 23, 1945 |
| 2,514,145 | Stevens | July 4, 1950 |

FOREIGN PATENTS

| Number | Country | Date |
|---|---|---|
| 487,238 | Germany | Dec. 4, 1929 |